(12) United States Patent
Jäsberg et al.

(10) Patent No.: US 12,398,996 B2
(45) Date of Patent: *Aug. 26, 2025

(54) METHOD FOR DETERMINING FILM THICKNESS, METHOD FOR PRODUCING A FILM AND DEVICE FOR PRODUCING A FILM

(71) Applicant: Stora Enso OYJ, Helsinki (FI)

(72) Inventors: Ari Jäsberg, Hankasalmi as (FI); Riku Pihko, Jyväskylä (FI); Otto Nylén, Helsinki (FI)

(73) Assignee: Stora Enso OYJ, Helsinki (FI)

( * ) Notice: Subject to any disclaimer, the term of this patent is extended or adjusted under 35 U.S.C. 154(b) by 66 days.

This patent is subject to a terminal disclaimer.

(21) Appl. No.: 17/757,253

(22) PCT Filed: Dec. 18, 2020

(86) PCT No.: PCT/IB2020/062188
§ 371 (c)(1),
(2) Date: Jun. 13, 2022

(87) PCT Pub. No.: WO2021/124251
PCT Pub. Date: Jun. 24, 2021

(65) Prior Publication Data
US 2023/0003509 A1    Jan. 5, 2023

(30) Foreign Application Priority Data

Dec. 20, 2019   (SE) .................................. 1951544-4

(51) Int. Cl.
*G01B 11/06* (2006.01)
*C08J 5/18* (2006.01)
(Continued)

(52) U.S. Cl.
CPC .............. *G01B 11/0691* (2013.01); *C08J 5/18* (2013.01); *C08L 1/02* (2013.01); *D21F 1/80* (2013.01);
(Continued)

(58) Field of Classification Search
CPC ... G01B 11/06; G01B 11/026; G01B 11/0616; G01B 11/0625; G01B 11/0633;
(Continued)

(56) References Cited

U.S. PATENT DOCUMENTS

| 4,406,740 A | 9/1983 | Brieu |
| 6,795,200 B1 * | 9/2004 | Barman ............... G01B 11/022 356/606 |

(Continued)

FOREIGN PATENT DOCUMENTS

| CN | 102725114 A | 10/2012 |
| CN | 103226105 A | 7/2013 |

(Continued)

OTHER PUBLICATIONS

International Search Report from corresponding PCT application No. PCT/IB2020/062188 dated Feb. 10, 2021.
(Continued)

*Primary Examiner* — Dominic J Bologna
*Assistant Examiner* — Jonathon Cook
(74) *Attorney, Agent, or Firm* — Greer, Burns & Crain, Ltd.

(57) ABSTRACT

The present document discloses a method of determining thickness of a wet film, in particular of microfibrillated cellulose. The method comprises conveying said film (20) in a wet state on a conveyor (10) having a conveyor width, the wet film having a film width which is less than the conveyor width, providing a laser projection (1511) across a film edge, acquiring a series of images, each depicting an area of the
(Continued)

conveyor, wherein the laser projection, a portion of the film and a portion of an exposed conveyor surface are visible, and using at least some of said images to determine at least one of a film thickness and a film thickness distribution across the film width. The document also discloses a method of forming a film, in particular a microfibrillated cellulose film, and a device for producing such film.

21 Claims, 3 Drawing Sheets

(51) Int. Cl.
*C08L 1/02* (2006.01)
*D21F 1/80* (2006.01)
*D21H 11/18* (2006.01)
*G01B 11/02* (2006.01)
*G01N 21/17* (2006.01)
*G01N 21/84* (2006.01)

(52) U.S. Cl.
CPC .......... *D21H 11/18* (2013.01); *G01B 11/026* (2013.01); *G01N 21/8422* (2013.01); *G01N 2021/1765* (2013.01); *G01N 2021/8444* (2013.01); *G01N 2021/845* (2013.01)

(58) Field of Classification Search
CPC .............. G01B 11/0641; G01B 11/065; G01B 11/0658; G01B 11/0675; G01B 11/0691; G01N 21/8422; G01N 21/89; G01N 21/8914; G01N 2021/1765; G01N 2021/8444; G01N 2021/845; G01N 2021/8917; C08J 5/18; D21F 1/00; D21F 1/08; D21F 1/80; D21H 11/18
See application file for complete search history.

(56) References Cited

U.S. PATENT DOCUMENTS

| | | | |
|---|---|---|---|
| 9,151,595 B1 | 10/2015 | Cook et al. | |
| 10,870,948 B2 | 12/2020 | Shitara | |
| 11,047,091 B2* | 6/2021 | Pihko | B32B 5/26 |
| 11,312,044 B2 | 4/2022 | Borloz et al. | |
| 11,313,080 B2 | 4/2022 | Valkonen | |
| 11,518,858 B2 | 12/2022 | Saukkonen et al. | |
| 2003/0116296 A1 | 6/2003 | Lin et al. | |
| 2005/0157314 A1 | 7/2005 | Typpoe et al. | |
| 2008/0156619 A1* | 7/2008 | Patel | G01B 11/0691 |
| | | | 356/625 |
| 2008/0230944 A1 | 9/2008 | Arai et al. | |
| 2009/0056156 A1 | 3/2009 | Hellstrom et al. | |
| 2010/0319886 A1 | 12/2010 | Avikainen et al. | |
| 2012/0292800 A1 | 11/2012 | Higuchi et al. | |
| 2013/0083332 A1 | 4/2013 | Heath et al. | |
| 2014/0098223 A1* | 4/2014 | Murata | G01B 11/026 |
| | | | 348/135 |
| 2016/0122946 A1 | 5/2016 | Mäntylä | |
| 2018/0274904 A1* | 9/2018 | Miura | G01B 15/02 |
| 2018/0356209 A1 | 12/2018 | Baker | |
| 2020/0174154 A1* | 6/2020 | Parmee | G01V 5/224 |
| 2020/0385227 A1* | 12/2020 | Petras | B65H 18/26 |

FOREIGN PATENT DOCUMENTS

| | | |
|---|---|---|
| CN | 109153158 A | 1/2019 |
| CN | 109890881 A | 6/2019 |
| CN | 209718396 U | 12/2019 |
| DE | 4221031 A1 | 1/1994 |
| DE | 202019103973 U1 | 7/2019 |
| EP | 1548398 A1 | 6/2005 |
| JP | H02104792 A | 4/1990 |
| JP | 2004277899 A | 10/2004 |
| JP | 2017190950 A | 10/2017 |
| SE | 1750164 A1 | 9/2018 |
| WO | 9604423 | 2/1996 |
| WO | 96031616 | 2/1996 |
| WO | 2008034954 A2 | 3/2008 |
| WO | 2017060046 A1 | 4/2017 |
| WO | WO-2018007673 A1 * | 1/2018 ............. B29C 41/28 |

OTHER PUBLICATIONS

Dumont, Guy A., Challenges and Opportunities in Pulp and Paper Process Control, Conference Proceedings Article, p. 1959-1964, published Jun. 1, 1988.

Extended European Search Report from corresponding European application No. EP20901522.1, dated Dec. 11, 2023.

Y.J. Sung et al., Applications of Thickness and Apparent Density Mapping by Laser Profilometry, Advances in Paper Science and Technology, Trans. of the XIIIth Fund. Res. Symp. Cambridge, 2005, pp. 961-1007, FRC, Manchester, 2018, DOI: 10.15376/frc.2005.2.961.

Marcel Schmitt et al., Slot die coating of lithium-ion battery electrodes, investigations on edge effect issues for stripe and pattern coatings, J. Coat. Technol. Res., 11(1), 57-63, 2014.

S.F. Busch et al., Inline Monitoring of Paper Thickness in an Industrial Setting, XP055340479, DOI: 10.1109/IRMMW-THz.2013.6665803.

China National Intellectual Property Administration, Rejection Decision from corresponding Japanese application No. 202080088227.X, dated Dec. 14, 2024.

Gao Hongwei , Basic Course of Electronic Packaging Process and Equipment Technology, Xi'an University Press, Section 7.3.3 of p. 238, Jul. 31, 2017.

* cited by examiner

METHOD FOR DETERMINING FILM THICKNESS, METHOD FOR PRODUCING A FILM AND DEVICE FOR PRODUCING A FILM

This application is a U.S. National Phase under 35 U.S.C. § 371 of International Application No. PCT/IB2020/062188, filed Dec. 18, 2020, which claims priority under 35 U.S.C. §§ 119 and 365 to Swedish Application No. 1951544-4 filed Dec. 20, 2019.

TECHNICAL FIELD

The present disclosure relates to a method for determining a film thickness. The disclosure also relates to a method and a device for producing a film. The methods find particular application in the production of microfibrillated cellulose films.

BACKGROUND

Microfibrillated cellulose ("MFC"), or "nanocellulose" is a material that consists of cellulose microfibrils that can be separated from cellulose fiber walls.

Nanocellulose comprises partly or totally fibrillated cellulose or lignocellulose fibers. The liberated fibrils have a diameter less than 1000 nm, whereas the actual fibril diameter or particle size distribution and/or aspect ratio (length/width) depends on the source and the manufacturing methods. The smallest fibril is called elementary fibril and may have a diameter of approximately 2-4 nm, while it is common that the aggregated form of the elementary fibrils, also defined as microfibril, is the main product that is obtained when making MFC e.g. by using an extended refining process or pressure-drop disintegration process. Depending on the source and the manufacturing process, the length of the fibrils can vary from around 1 to more than 10 micrometers. A coarse nanocellulose grade might contain a substantial fraction of fibrillated fibers, i.e. protruding fibrils from the tracheid (cellulose fiber), and with a certain amount of fibrils liberated from the tracheid (cellulose fiber).

Nanocellulose can also be characterized by various physical or physical-chemical properties such as its large surface area or its ability to form a gel-like material at low solids (1-5 wt %) when dispersed in water. The cellulose fiber is preferably fibrillated to such an extent that the final specific surface area of the formed nanocellulose is from about 1 to about 500 $m^2/g$, such as from about 1 to about 200 $m^2/g$, or more preferably 50-200 $m^2/g$ when determined for a solvent exchanged and freeze-dried material with the BET method.

Various methods exist to make nanocellulose, such as single or multiple pass refining, pre-hydrolysis or enzymatic treatment followed by refining or high shear disintegration or liberation of fibrils. Nanocellulose can be produced from wood cellulose fibers, both from hardwood and softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper. The term nanocellulose includes parenchymal nanocellulose and BNC (bacterial nanocellulose). Nanocellulose can also be obtained from vegetable fibers, e.g. sugar beet or potato based nanocellulose.

The above described definition of nanocellulose includes, but is not limited to, the definition of nanocellulose in the ISO/TS 20477:2017 standard.

There are further synonyms for nanocellulose/MFC such as cellulose microfibrils, fibrillated cellulose, nanofibrillated cellulose (NFC), fibril aggregates, nanoscale cellulose fibrils, cellulose nanofibers, cellulose nanofibrils, nanocrystalline cellulose, cellulose microfibers, cellulose fibrils, cellulose nanofilaments, microfibrillar cellulose, microfibril aggregrates and cellulose microfibril aggregates.

Current research indicates that MFC may be a suitable material for packaging and coating of packaging, due to its strength and barrier properties. Hence, MFC has the potential of replacing or supplementing currently used barrier films, including polymer and metal films.

Forming of MFC films can be achieved by solvent casting of a viscous or gel-like fluid material on a continuous conveyor belt, followed by dewatering/drying (e.g. evaporation) of the solvent.

The term "solvent casting" is a known term designating methods wherein a film is produced by applying a wet film comprising a film forming component which is distributed in a medium that is to be essentially removed, for example by dewatering and/or evaporation. The film forming component may be dispersed in a dispersing medium or dissolved in a solvent, hence the term "solvent casting".

However, in order to achieve uniform properties of the film, and to achieve a film with appealing visual properties, it is important to control the film thickness with high accuracy, and to be able to quickly adjust the film thickness, should a deviation appear.

Prior art methods of determining MFC film thickness are limited in that they require the film to be separated from the substrate, or in that they require the substrate, onto which the film is being cast, to be transparent, which is not the case when casting the film onto a solid steel belt.

For example, one method that is used to measure thickness of continuous cast or extruded films, papers and coatings relies on absorption of radiation in the web that passes between the traversing measurement gauges. The problem with such a system is that it cannot be used for MFC film on a solid steel belt. Hence, such systems are used on films and webs after detachment from the casting or forming substrate, which would be problematic with an MFC film as an MFC film cannot be separated from the substrate until it is essentially dry. Moreover, open draws of unsupported film can be detrimental for product quality.

Another disadvantage of the method described above relates to process control: when the thickness measurement is used for control of the casting process, the delay time between casting point and state of film is a disadvantage. Furthermore, traversing measurement only gives periodical information from each position in cross-machine direction, in which case it does not capture all process variations.

Hence, there is a need for an improved method of determining and controlling film thickness.

SUMMARY

It is a general object of the present disclosure to provide an improved method and device for determining thickness of a wet film, which may be of nanocellulose, or of other cellulose film. In particular, it is an object to provide a method and a device which enable more accurate monitoring of film thickness and optionally of film damage.

The invention is defined by the appended independent claims, with embodiments being set forth in the dependent claims, in the following description an in the attached drawings.

According to a first aspect, there is provided a method of determining thickness of a wet film. The method comprises conveying said film in a wet state on a conveyor having a conveyor width, the wet film having a wet film width which is less than the conveyor width, providing a laser projection across the conveyor, the laser projection extending across a wet film edge, acquiring a series of images, each depicting an area of the conveyor, wherein the laser projection, a portion of the wet film and a portion of an exposed conveyor surface are visible, and using at least some of said images to determine at least one of a wet film thickness and a wet film thickness distribution across the wet film width.

The method allows to follow and adjust film thickness and casting profile in real time. Optionally, a film section may be delivered together with thickness and/or profile data.

The method is useful for a wet film having a thickness of 10-10000 micron, preferably 10-5000 micron, 10-1000 micron, 50-10000 micron, 50-5000 micron, 50-1500 micron, 50-1000 micron or 50-500 micron.

The method is useful for a wet film having a light transmission in the wavelength of the laser of less than 80%, preferably less than 70*%.

The method is particularly suitable for determining continuous thickness variations, i.e. thickness variations that extend continuously along the direction of travel of the conveyor.

In the context of the present application, a wet film is a film having a solids content of less than 50% by weight, preferably of 1-50% by weight, 3-50% by weight, 3-20% by weight, 3-15% by weight or 3-6% by weight.

The wet film is applied as a continuous layer across a substantial part of a width of the conveyor and along the direction of movement of the conveyor.

It is possible to apply one or more pre-drying steps or dewatering steps upstream of an area where the images are captured.

For example, a pre-drying step may comprise forced evaporation, which may be achieved by e.g. radiation in the form of IR and/or microwaves to reach certain a desired solids content.

As another example, a dewatering step may be applied, e.g press dewatering or dewatering by capillary effect through a porous substrate, driven by gravity or assisted by vacuum.

Dewatering and/or the subsequent drying may also be assisted by impingement of radiation (IR, microwave), steam or hot air.

The laser projection may be a line or any predetermined pattern.

For example, the laser projection may extend over a width which is greater than the wet film width.

The wet film comprises a film forming component, which is distributed in a medium that is to be essentially removed by a separation method, such as dewatering and/or evaporation, to arrive at a dry film. In the context of the present application, a dry film is a film having a medium content of 0.1-15% by weight.

The film forming component may be dispersed in a dispersing medium, whereby the dispersing medium is to be essentially removed. Alternatively, the film forming component may be dissolved in a solvent, whereby the solvent is to be essentially removed. In any event, the medium is in a liquid stage when the casting takes place.

The film forming component may comprise MFC and one or more property-modifying additives and/or fillers. Preferably, the film forming component comprises at least 50% by weight of MFC, preferably at least 60%, at least 70% or at least 80% MFC. For example, the film forming component may also comprise other natural fibre material in addition to the MFC.

The film forming component optionally also comprises a water soluble polymer that can form a film and/or improve bonding between cellulose fibrils. Typical example of such polymers are e.g. natural gums or polysaccharides or derivatives thereof such as e.g. CMC, starch.

The film may comprise a film forming component, which is distributed in a medium that is to be essentially removed, wherein a content of the medium of the wet film, at the point of image capture, is at least 75% by weight, preferably more than 80% by weight, more than 85% by weight, more than 90% by weight, or more than 95% by weight.

The film may be a cellulose based film, in particular a microfibrillated cellulose ("MFC") film.

The MFC may be unmodified MFC or chemically modified MFC, or a mixture thereof. Unmodified MFC refers to MFC made of unmodified or native cellulose fibers. The unmodified MFC may be a single type of MFC or it can comprise a mixture of two or more types of MFC differing e.g. in the choice of cellulose raw material or manufacturing method. Chemically modified MFC refers to MFC made of cellulose fibers that have undergone chemical modification before, during or after fibrillation. The chemically modified MFC may be a single type of chemically modified MFC or it can comprise a mixture of two or more types chemically modified MFC, differing e.g. in the type of chemical modification, the choice of cellulose raw material or the manufacturing method.

The laser projection may be applied between a casting device and a first drying device, preferably closer to the casting device than to the drying device.

That is, the laser projection is applied to the wet film while the film is still in a wet state.

The laser projection may be applied at a position along a forward direction of the conveyor, where a belt support is arranged.

Hence, the laser projection is applied to a portion of the belt which presents relatively little vertical variation, due to the belt support.

The conveyor may be a metal belt conveyor, such as a steel belt conveyor, a polymer conveyor or a paper conveyor.

The conveyor may extend laterally beyond a wet film edge at both lateral sides of the wet film.

The laser projection may be applied as a fixed pattern, or the laser may be scanned with a frequency that is greater than an image capture frequency, so as to effectively present a pattern.

The laser projection may be applied from a laser direction which extends at an angle to a direction of travel of the conveyor, and in a vertical plane containing said direction of travel, said angle being 5-80 degrees, preferably 10-60 degrees or 15-40 degrees.

Alternatively, the laser projection may be applied from a laser direction which extends at an angle to a direction of travel of the conveyor, and in a vertical plane containing said direction of travel, said angle being 100-175 degrees, preferably 100-150 degrees or 105-130 degrees.

The images may be captured such that an image plane of the image capture device is perpendicular to a line that extends in the vertical plane and at an angle of 30-150 degrees, preferably 40-90 degrees, to the laser direction.

The laser direction and the line that is perpendicular to the image plane are in the same plane, which may be vertical and parallel to the direction of travel of the conveyor.

A wet film thickness may be determined as a difference between a measured distance to a conveyor surface laterally outside the wet film and a measured distance to a wet film surface.

An average wet film thickness may be determined as a difference between a measured distance to a conveyor surface laterally outside the wet film and a plurality of measured distances to a wet film surface within the wet film width.

According to a second aspect, there is provided a method of producing a film. The method comprises providing a continuous conveyor having a conveyor width, using a casting device for applying a film comprising a film forming component which is distributed in a medium that is to be essentially removed onto the conveyor, so as to solvent cast the film, determining a wet film thickness and/or a wet film thickness distribution according to the method described above, and adjusting at least one casting parameter based on said determined wet film thickness and/or wet film thickness distribution, so as to change a wet film thickness and/or a wet film thickness distribution provided by the casting device.

Casting devices suitable for applying a liquid to a continuous conveyor belt are known as such, and typically comprise an elongate nozzle, which extends along a width direction and has a length corresponding to a width of the film layer that is to be formed.

After the image capture, the film is passed through one or more dewatering and/or drying zones, where the medium of the wet film is removed to achieve the dry film.

The film formed by the present method may, when dry, have a thickness of 10-100 micron, preferably 15-60 micron.

The film may be a barrier film, a membrane film or a nano paper.

Adjusting at least one casting parameter may comprise adjusting a film feed rate and/or feed distribution.

Adjusting at least one casting parameter may comprise adjusting a doctor blade, which is configured for controlling a wet film thickness and/or wet film thickness distribution.

Adjusting at least one casting parameter may comprise adjusting a lip of a slot die type casting unit.

According to a third aspect, there is provided a device for producing a film, comprising a continuous conveyor having a conveyor width, a casting device for applying a wet film comprising a film forming component which is distributed in a medium that is to be essentially removed onto the conveyor, for solvent casting the film to provide a wet film width that is less than the conveyor width, a laser projection device configured to provide a laser projection across a wet film edge, an image capture device, configured to acquire a series of images, each depicting an area of the conveyor, wherein the laser projection, a portion of the wet film and a portion of an exposed conveyor surface are visible, and a processing device, configured to use at least some of said images to determine at least one of a wet film thickness and a wet film thickness distribution across the wet film width.

The device may further comprise an adjustable device, configured for adjusting the casting device based on said determined film thickness and/or film thickness distribution, so as to change a film thickness and/or a film thickness distribution provided by the casting device.

DETAILED DESCRIPTION

Figure 1:
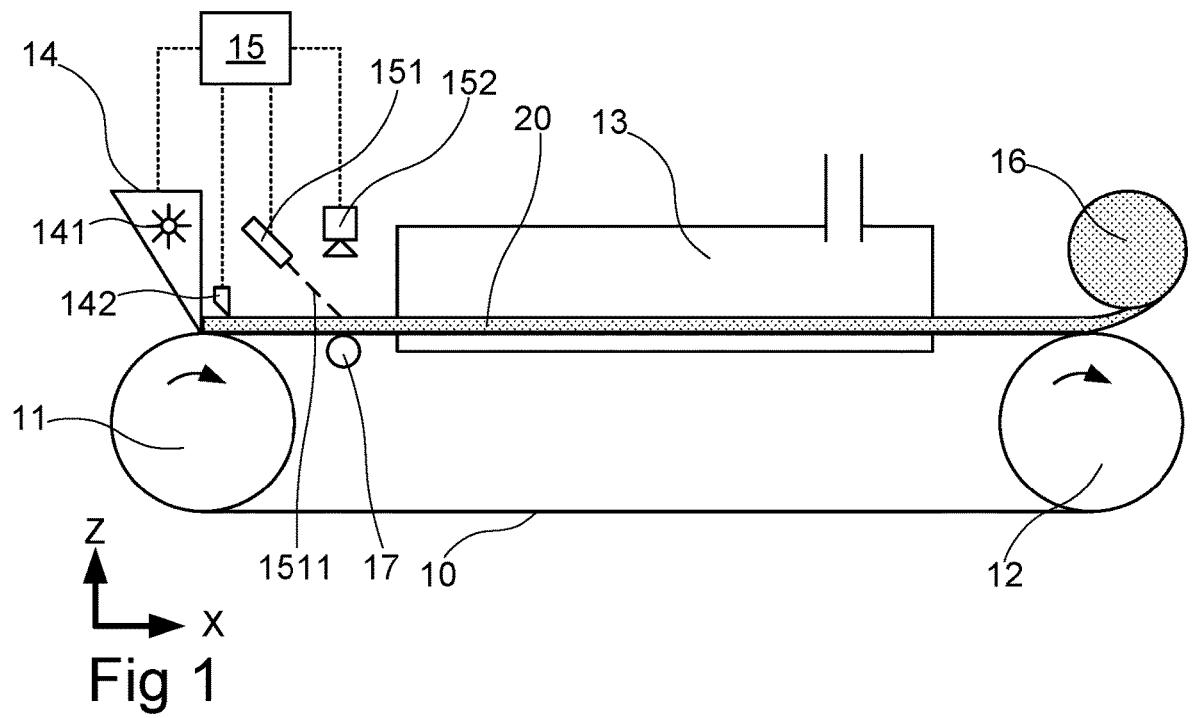
FIG. 1 schematically illustrates a side view of a device for solvent casting a film.
Figure 2:
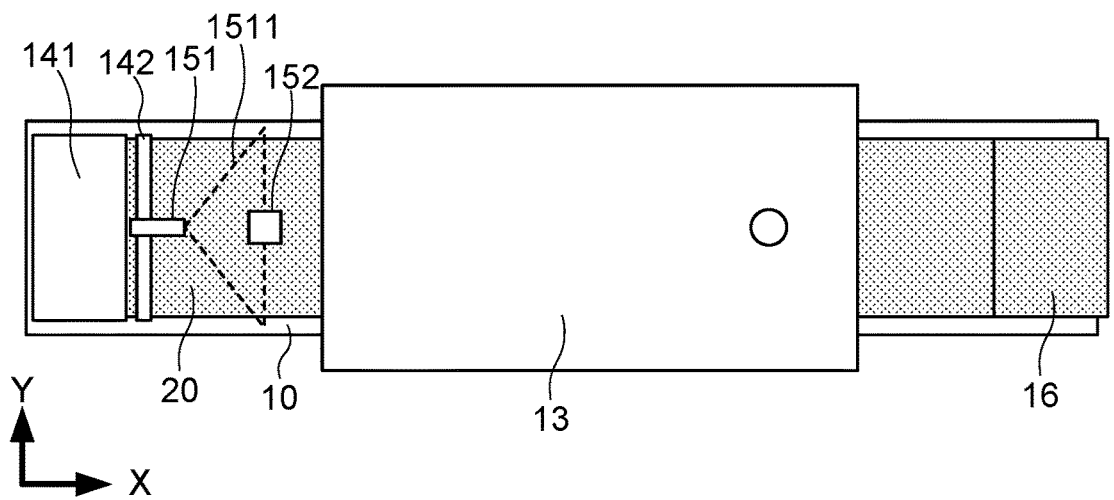
FIG. 2 schematically illustrates a top view of the device in FIG. 1.

The drawings schematically illustrate a device in which the present invention can be practiced. Devices for use in belt casting are known as such and will thus be only briefly described with reference to the drawings.

A belt casting machine typically comprises a conveyor belt 10, which may be a solid steel belt or a continuous, smooth belt of polymer or paper material.

A steel belt may be ground or polished to provide a smooth film surface. For very smooth film surface, a mirror quality polished steel belt may be used.

A polymer or paper belt may have a surface coating for rendering the surface sufficiently smooth.

The conveyor belt may be a continuous, or endless, conveyor belt, such as a metal belt and in particular a steel belt.

The conveyor belt is arranged to run over at least a pair of conveyor belt pulleys 11, 12, at least one of which may be a drive pulley. Further support pulleys may, but need not, be provided. Typically, a belt speed may be on the order of at least 10 m/m in, possibly at least 50 m/m in or at least 75 m/min.

A belt width may be on the order of 0.3-8 m, typically 0.5-6 m or 1-5 m.

A drying chamber 13 may be provided over a portion of the belt. Such a drying chamber may be arranged to completely enclose the belt, as seen in a cross section, perpendicular to a belt travel direction. The drying chamber may comprise one or more zones, in which a controlled temperature, gas atmosphere and airflow may be provided. For example, it may be desirable to provide an elevated temperature for facilitating solvent evaporation as well as a low humidity air to maximize the air's ability to receive evaporated solvent. An evacuation airflow may connect to a solvent recovery or destruction device.

The drying chamber may be preceded by one or more pre-drying or dewatering zones (not shown).

One or more pre-drying steps or dewatering steps may be provided upstream of an area where the images are captured.

Alternatively, or as a supplement, one or more pre-drying steps or dewatering steps may be provided downstream of an area where the images are captured, but upstream of the drying chamber 13.

For example, a pre-drying step may comprise forced evaporation, which may be achieved by e.g. radiation in the form of IR and/or microwaves to reach certain a desired solids content.

As another example, a dewatering step may be applied, e.g press dewatering or dewatering by capillary effect through a porous substrate, driven by gravity or assisted by vacuum.

Dewatering and/or the subsequent drying may also be assisted by impingement of radiation (IR, microwave), steam or hot air.

At one end of the conveyor 10, such as by the first belt pulley 11, there may be provided a film applicator 14. The film applicator 14 may have one or more feeders 141 and/or a doctor blade 142, which can be used to control a film thickness and/or thickness distribution across the belt width.

A controller 15 may be arranged to control the feeder 141, an external feed pump (not shown), a lip of a slot die type casting unit and/or the doctor blade 142 through drive motors or actuators (not shown).

A laser projection device 15 comprises a laser source 151 and an image capture device 152, such as a camera.

The laser projection device 151 provides a laser projection 1511 across a film width and the image capture device 152 acquires images of at least portions of the laser projection 1511.

On a flat surface, the laser projection 1511 would provide a predetermined pattern, such as, but not limited to, a straight line extending across the conveyor 10 at a right angle to its direction of travel.

The laser may operate with an about 380-900 nm wavelength, preferably 380-750 nm, more preferably 625-740 nm.

The laser projection device 151 may be formed of one or more laser sources 151, which may be coordinated to provide different parts of the laser projection 1511 and/or to reinforce each other to provide increased intensity of the projection 1511.

The laser projection device may operate by scanning a laser dot or by a fanning filter to provide a fixed projection.

In use, the conveyor belt is driven at a predetermined speed, in a forward direction, which is indicated as an 'X' direction in the drawings, while a film solution 20 is fed onto a belt surface. In an area downstream of the film applicator, the laser projection 1511 is applied across the film, while the image capture device 152 is used to acquire images, each of which showing the laser projection, the film surface and the exposed belt surface laterally outside the film surface.

Figure 4:
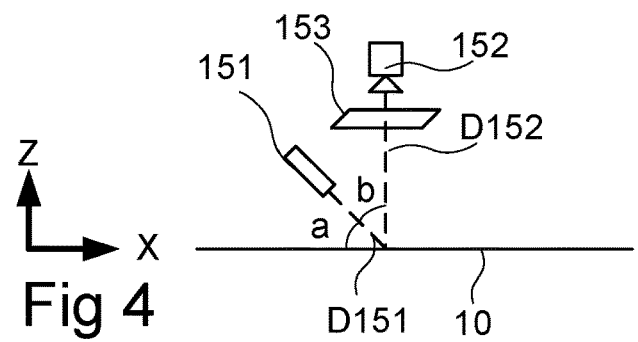
FIG. 4 schematically illustrates a detail view of the laser projection device of FIG. 1.

Referring to FIG. 4, the laser source 151 may be directed along a direction D151 at an angle a of 5-80 degrees, preferably 10-60 degrees, or 15-40 degrees, to the conveyor surface, as seen in a vertical plane X-Z parallel to the conveyor direction of travel. As particular examples, the laser source may be directed at an angle of 10-20 degrees, 20-30 degrees, 30-40 degrees, 40-50 degrees, 50-60 degrees, 60-70 degrees or 70-80 degrees to the conveyor surface.

Alternatively, the angle may be 100-175 degrees, preferably 100-150 degrees or 105-130 degrees, when the laser projection is applied along a direction opposite to the forward direction.

The Image capture device 152 may be directed along a direction D152 at an angle b of 30-150 degrees, preferably 40-90 degrees, to the laser source direction D151, seen in said vertical plane X-Z.

A filter 153 may be arranged in a light path of the laser light between the conveyor and the image capture device 152. The filter may be matched to the relevant laser wavelength(s).

A film thickness direction is indicated as a 'Z' direction in the drawings and a film width is indicated as a 'Y' direction in the drawings.

The controller 15 receives the images and performs image processing to determine film thickness and/or film thickness distribution across the film width.

Based on the determined film thickness and/or film thickness distribution, the feeder 141, an external feed pump (not shown), a lip of a slot die type casting unit and/or the doctor blade 142 may be adjusted in order to adjust the film thickness, when the controller 15 determines the film thickness and/or film thickness distribution to be outside an acceptable range.

When applying the film in its wet state, it may have 1-25% or 3-20% solids by weight, the remaining part being solvent(s) or dispersing medium(s), preferably the solids part may be (by weight) 1-3%, 3-6%, 6-9%, 9-12%, 12-15%, 15-18%, 18-21%, 21-24% or 24-25%.

The solids part may comprise the main material, such as MFC, and one or more additives. The main material may be present by at least 50% by weight of the solids part, preferably by at least 60, 70, 80 or 90% by weight.

Typical additives used to provide specific film properties may include antiblocking and antistatic compounds, chelating agents, colors, electrical conductive substances, pigments etc.

Other additives may include natural fibre material, such as wood based material.

The film is passed through the drying chamber, and subsequently caused to release from the belt 10, after which the film may be packaged for transportation, such as by being rolled onto a reel 16.

The conveyor belt may be supported by one or more belt supports 17, which may be provided as rollers or slide supports, which may extend over all or part of the belt width.

The laser projection may be applied to the belt surface at the contact area between the support 17 and the belt 10. Preferably, the laser projection may be provided within a distance in the X direction of 50% of a support roller diameter from a contact line parallel with the Y axis between the support roller 17 and the belt 10, and preferably within a distance of 25% of such support roller diameter.

Figure 3:
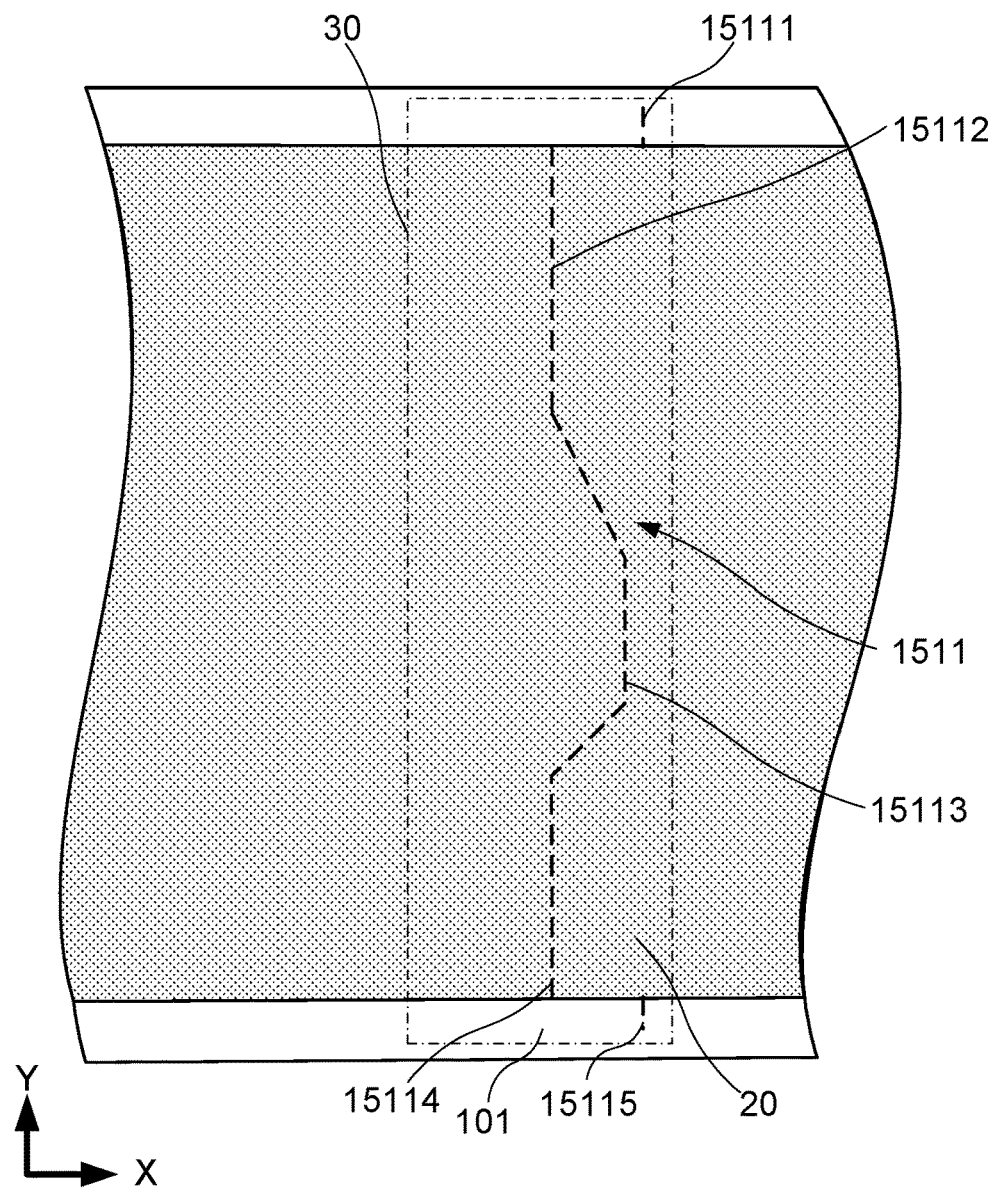
FIG. 3 schematically illustrates a top view of a detail of the device in FIG. 2.

FIG. 3 schematically illustrates a section of the belt 10 with the wet film 20 in magnification, with an example of an image frame 30 being indicated by a dash-dotted line and with a laser projection 1511 being indicated by a dashed line.

Preferably, the laser projection is provided from a laser direction in a vertical plane that is parallel with the forward direction X of the conveyor belt, i.e. in the X-Z plane and at an angle a as described above.

In the illustrated case, the laser projection 1511 on its target area presents five sections, which are displaced relative each other in the X direction, thus indicating thickness and/or thickness variations of the film 20.

A first pair of laser projections 15111, 15115 fall onto an exposed surface portions 101 of the belt 10. These laser projections 15111, 15115 will thus indicate a zero thickness level, and can be used to indicate a reference plane parallel with the X-Y plane.

A second pair of laser projections 15112, 15114 fall onto the wet film 20 surface and closer to the projection device 141 than the first pair of laser projections, indicating a higher level, which may be the desired film surface.

A third laser projection portion 15113 is laterally beyond the second pair of laser projections 15112, 15114, thus indicating a lower level.

Hence, the distance in the X-direction between the first and second pairs of laser projections 15111, 15115; 15112, 15114 indicate the film thickness. The film thickness can be calculated with knowledge of the projection angle and said distance in the X-direction.

The third laser portion 15113, which indicates a thickness reduction, can be identified and measured in a similar manner.

Images may be taken with a predetermined frequency, which may be determined based on the belt speed.

Each image may be analyzed to identify the position of the laser projection in that image and to calculate e.g. an average film thickness, a maximum film thickness, a minimum film thickness or a thickness standard deviation.

An alarm may be activated and feeding and/or conveyor advancement may be stopped if one or more of the above mentioned parameters deviate from a predetermined range.

The result may be used as input for adjusting the feeder 14. Such adjustment may comprise adjusting a feed speed over all or part of a feeder 141 width.

Optionally or as a supplement, the result may be used as an input for adjusting a doctor blade 142.

Further optionally or as a supplement, the result may be used as an input for adjusting a lip of a slot die type casting unit.

Yet optionally, the produced film may be delivered with a movie showing in detail the thickness profile for a whole film or film portion.

While the disclosure herein has been directed to MFC, it is understood that the method and device may also be used in production of other types of films, including but not limited to, cellulose based films, such as cellulose triacetate, polymer films, such as polyimide, liquid-crystalline polymer or poly(vinylidene fluoride), and edible films, such as sodium caseinate and calcium caseinate based films.

In order to achieve an accurate measurement of the film, it is possible to measure the film thickness at the additional belt support, as mentioned above.

As an additional measure, it is possible to perform a calibration run on the belt, so as to determine the belt's shape when empty of the film.

It is also possible to simultaneously apply a laser measurement as described above to the underside of the belt, and to use the result of such measurement to compensate for variations in belt shape and/or movements.

EXAMPLE

In the following, data from a test run will be presented.

A film comprising microfibrillated cellulose was made on a belt casting machine consisting of a film applicator 14, a feeder 141, a doctor blade 142 and a carrier medium or conveyor 10 in the form of a steel belt having an Ra roughness of 1.3 μm and Rz roughness of 7.5 μm.

A suspension was applied on the conveyor 10 to form a wet film with a thickness of 775 μm and a width of 500 mm at a speed of 5.5 m/min (speed of steel belt). A solid content of the wet film was 4.21 wt-%, i.e. 95.79 wt-% water and 3.58 wt-% of microfibrillated cellulose and 0.63 wt-% of sorbitol.

The microfibrillated cellulose used was an enzymatically treated bleached kraft fiber which was further disintegrated and high pressure fluidized to obtain a fine MFC quality, which is substantially free from fiber residual.

The thickness of the wet film 20 was measured with a laser projection device 15 after depositing and obtaining a wet film, but before further dewatering or evaporation/drying 13.

A laser light source 151 with wavelength of 660 nm was used to make a cross-machine directional laser line, extending across the wet film width and approximately 10 cm outside the edge of the wet film on the steel belt substrate.

A position of the laser line was approximately 50 cm downstream of the deposition of the wet film in the moving direction X of the steel belt. The laser line was projected on the wet film from a laser direction D151 which extends at an angle of 130 degrees to the moving direction X of the steel belt. A camera was used as an image capture device 152, acquiring images of the area of the moving steel belt where the laser projection, a portion of wet film and a portion of the steel belt were visible. Images were captured at a frame rate of 30 frames per second. The camera was positioned D152 at an angle of 60 degrees from the direction of laser and 70 degrees to the moving direction X of the steel belt.

Figure 5:
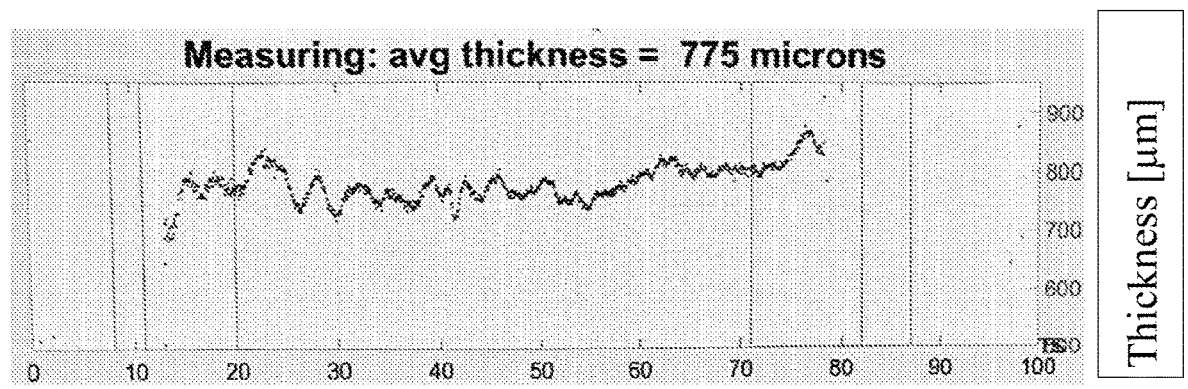
FIG. 5 is a graph showing wet film thickness over the whole width of the film.

Each image was analyzed for the position of the laser line on the wet film or on the steel belt, such that a certain camera pixel were assigned to correspond to a certain height position of wet film and steel belt. Film thickness was obtained from this data by subtracting the steel belt height position from wet film height position at each cross-directional Y position. Film thickness data from each cross-directional position was then arranged in thickness-CD-position diagram to obtain film thickness profile, as illustrated in FIG. 5.

Figure 6:
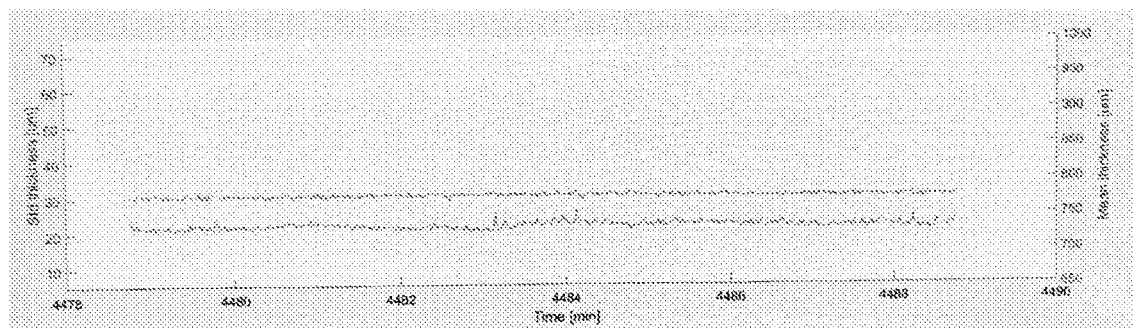
FIG. 6 is a graph showing the development of the average wet film thickness over time.

Furthermore, different statistical values such as mean thickness and standard deviations of mean thickness could be calculated from the data. 775 μm was measured as mean thickness and 22 microns as standard deviation. The data could be further saved and plotted against time to be able to follow development of mean thickness and its standard deviation over time, as illustrated in FIG. 6.

Figure 7:
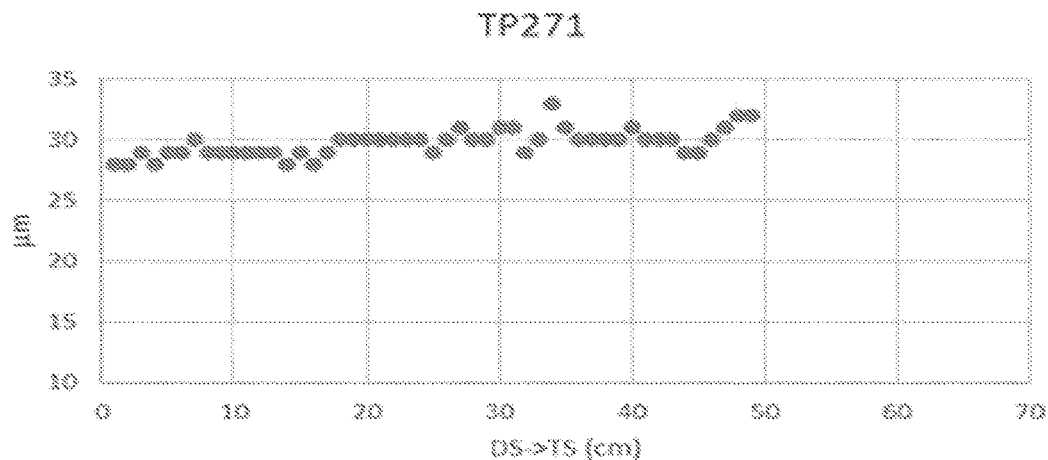
FIG. 7 is a graph showing dry film thickness, as measured at points which are spaced apart 1 cm in the cross-film direction Y.

Corresponding dry film thickness is illustrated in FIG. 7, wherein the dry film thickness, as measured at points which are spaced apart 1 cm in the cross-film direction Y.

The invention claimed is:

1. A method of determining thickness of a wet cellulose-based film, comprising:
    forming said wet cellulose-based film on a conveyor using a casting device, wherein said wet cellulose-based film comprises a film forming component distributed in a medium;
    conveying said wet cellulose-based film, in a wet state, on the conveyor having a conveyor width, the wet cellulose-based film having a wet film width which is less than the conveyor width;
    providing a laser projection across the conveyor, the laser projection extending across a wet film edge;
    acquiring a series of images, each depicting an area of the conveyor, wherein the laser projection, a portion of the wet film, and a portion of an exposed conveyor surface are visible, wherein said wet cellulose-based film comprises at least 75% by weight of the medium when the series of images is acquired, and
    using at least some of said images to determine at least one of a wet film thickness and a wet film thickness distribution across the wet film width; and
    drying the wet cellulose-based film in a first drying device.

2. The method as claimed in claim 1, wherein the laser projection extends over a width which is greater than the wet film width.

3. The method as claimed in claim 1, wherein the wet cellulose-based film comprises at least 90% by weight of the medium when the series of images is acquired.

4. The method as claimed in claim 1, wherein the wet cellulose-based film is a cellulose based film.

5. The method as claimed in claim 1, wherein the laser projection is applied between the casting device and the first drying device.

6. The method as claimed in claim 1, wherein the laser projection is applied at a position along a forward direction of the conveyor, where a belt support is arranged.

7. The method as claimed in claim 1, wherein the conveyor is a metal belt conveyor, a polymer conveyor, or a paper conveyor.

8. The method as claimed in claim 1, wherein the conveyor extends laterally beyond the wet film edge at both lateral sides of the wet cellulose-based film.

9. The method as claimed in claim 1, wherein the laser projection is applied as a fixed pattern, or wherein the laser is scanned with a frequency that is greater than an image capture frequency so as to effectively present a pattern.

10. The method as claimed in claim 1, wherein the laser projection is applied from a laser direction which extends at an angle to a direction of travel of the conveyor, and in a vertical plane containing said direction of travel, said angle being 5-80 degrees.

11. The method as claimed in claim 1, wherein the laser projection is applied from a laser direction which extends at an angle to a direction of travel of the conveyor, and in a vertical plane containing said direction of travel, said angle being 100-175 degrees.

12. The method as claimed in claim 10, wherein the images are captured such that an image plane of the image capture device is perpendicular to a line that extends in the vertical plane and at an angle of 30-150 degrees to the laser direction.

13. The method as claimed in claim 1, wherein a wet film thickness is determined as a difference between a measured distance to a conveyor surface laterally outside the wet cellulose-based film and a measured distance to a wet film surface.

14. The method as claimed in claim 1, wherein an average wet film thickness is determined as a difference between a measured distance to a conveyor surface laterally outside the wet film and a plurality of measured distances to a wet film surface within the wet film width.

15. The method as claimed in claim 1, wherein the wet cellulose-based film is a microfibrillated cellulose film.

16. A method of producing a wet cellulose-based film, comprising:
provising a continuous conveyor having a conveyor width,
using a casting device for applying the wet cellulose-based film comprising a film forming component, which is distributed in a medium that is to be essentially removed, onto the conveyor, so as to solvent cast the wet cellulose-based film,
determining a wet film thickness, or a wet film thickness distribution, or both by:
providing a laser projection across the conveyor, the laser projection extending across a wet film edge,
acquiring a series of images, each depicting an area of the conveyor, wherein the laser projection, a portion of the wet cellulose-based film, and a portion of an exposed conveyor surface are visible, wherein said wet cellulose-based film comprises at least 75% by weight of the medium when the series of images is acquired, and
using at least some of said images to determine at least one of the wet film thickness and the wet film thickness distribution across the wet film width, and
adjusting at least one casting parameter based on said determined wet film thickness, or said wet film thickness distribution, or both, so as to change the wet film thickness, the wet film thickness distribution, or both provided by the casting device.

17. The method as claimed in claim 16, wherein adjusting at least one casting parameter comprises adjusting a wet film feed rate, or a feed distribution, or both.

18. The method as claimed in claim 16, wherein adjusting at least one casting parameter comprises adjusting a doctor blade, which is configured for controlling the wet film thickness, or the wet film thickness distribution, or both.

19. The method as claimed in claim 16, wherein adjusting at least one casting parameter comprises adjusting a lip of a slot die type casting unit.

20. A device for producing a wet cellulose-based film, comprising:
a continuous conveyor having a conveyor width;
a casting device for applying the wet cellulose-based film comprising a film forming component, which is distributed in a medium that is to be essentially removed, onto the conveyor, for solvent casting the wet cellulose-based film to provide a wet film width that is less than the conveyor width;
a laser projection device configured to provide a laser projection across a wet film edge;
an image capture device configured to acquire a series of images, each depicting an area of the conveyor, wherein the laser projection, a portion of the wet cellulose-based film, and a portion of an exposed conveyor surface are visible, the image capture device positioned at a location wherein said wet cellulose-based film comprises at least 75% by weight of the medium when the series of images is acquired; and
a processing device, configured to use at least some of said images to determine at least one of a wet film thickness and a wet film thickness distribution across the wet film width.

21. The device as claimed in claim 20, further comprising an adjustable device configured for adjusting the casting device based on said determined wet film thickness, said determined wet film thickness distribution, or both so as to change the wet film thickness, the wet film thickness distribution, or both provided by the casting device.

* * * * *